March 26, 1929. W. L. WRIGHT ET AL 1,706,910
APPARATUS FOR MAKING PAPER CONTAINERS
Filed April 20, 1927    6 Sheets-Sheet 1

Inventors
W. L. Wright
J. T. Baird
W Hubert Eick atty

March 26, 1929. W. L. WRIGHT ET AL 1,706,910
APPARATUS FOR MAKING PAPER CONTAINERS
Filed April 20, 1927 6 Sheets-Sheet 2

Inventors,
W. L. Wright
J. T. Bodd
by Hubert E. Peck
atty

March 26, 1929. W. L. WRIGHT ET AL 1,706,910
APPARATUS FOR MAKING PAPER CONTAINERS
Filed April 20, 1927 6 Sheets-Sheet 4
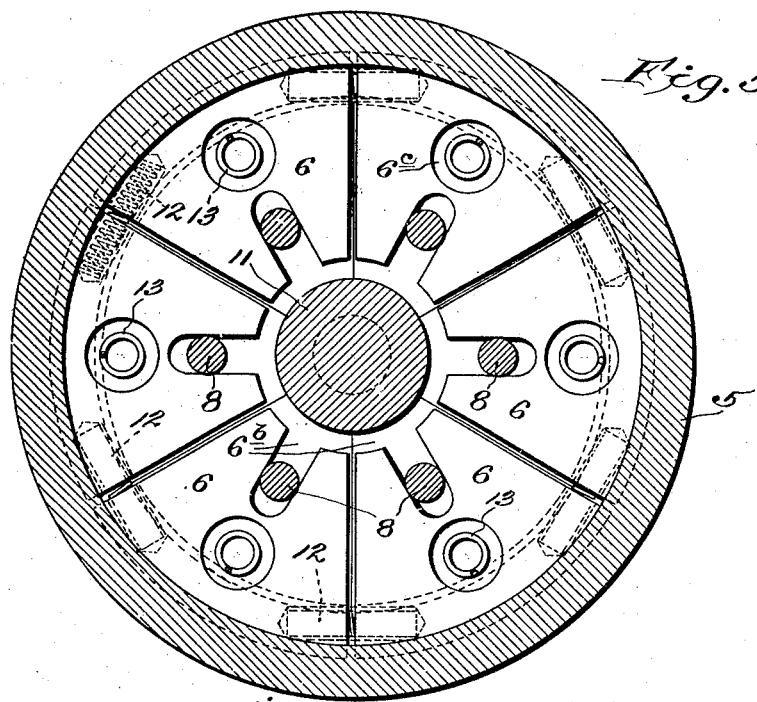
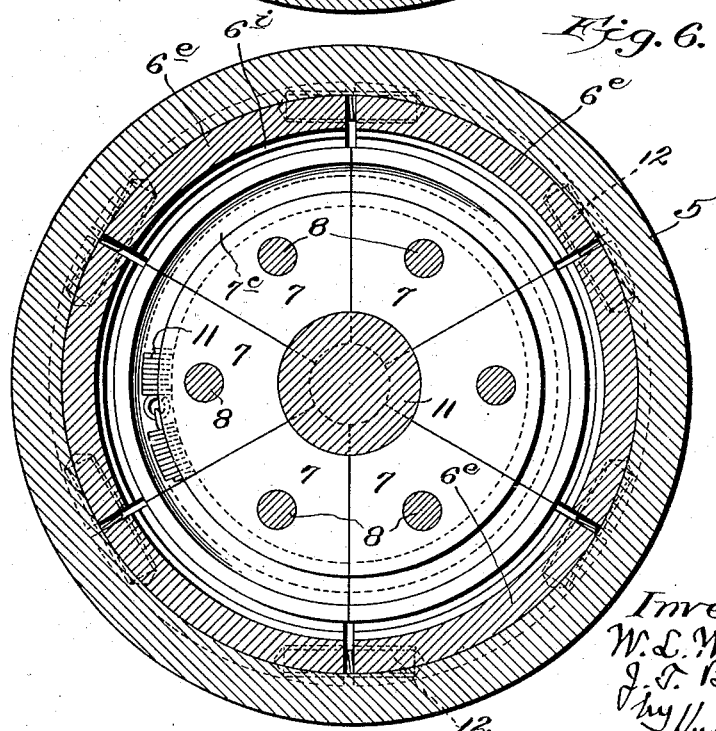

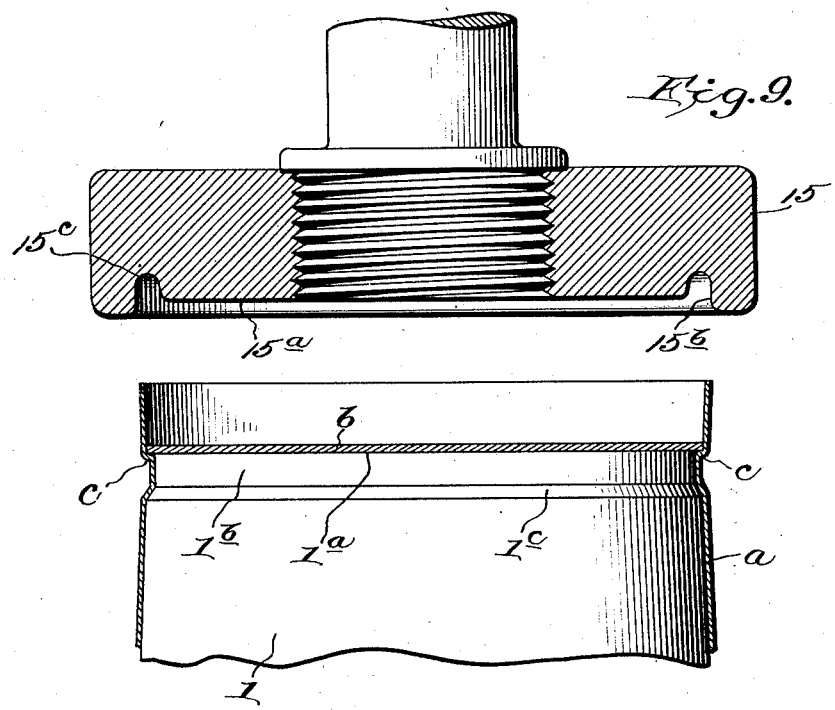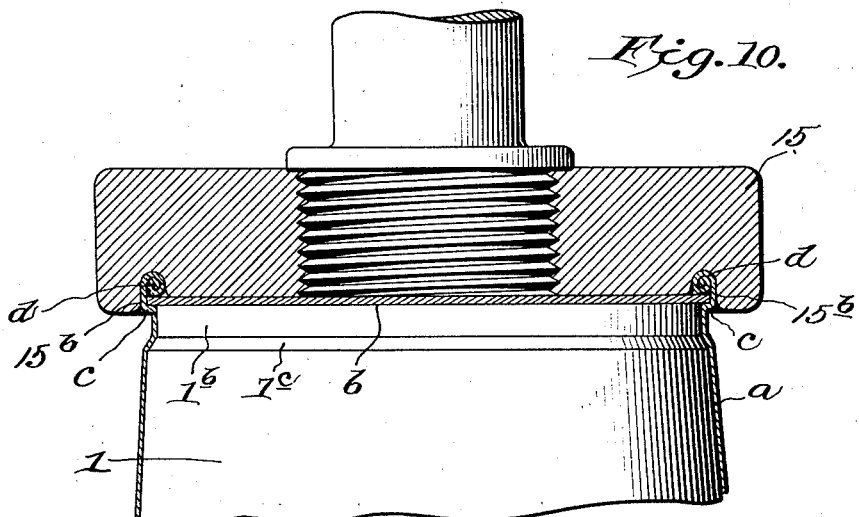

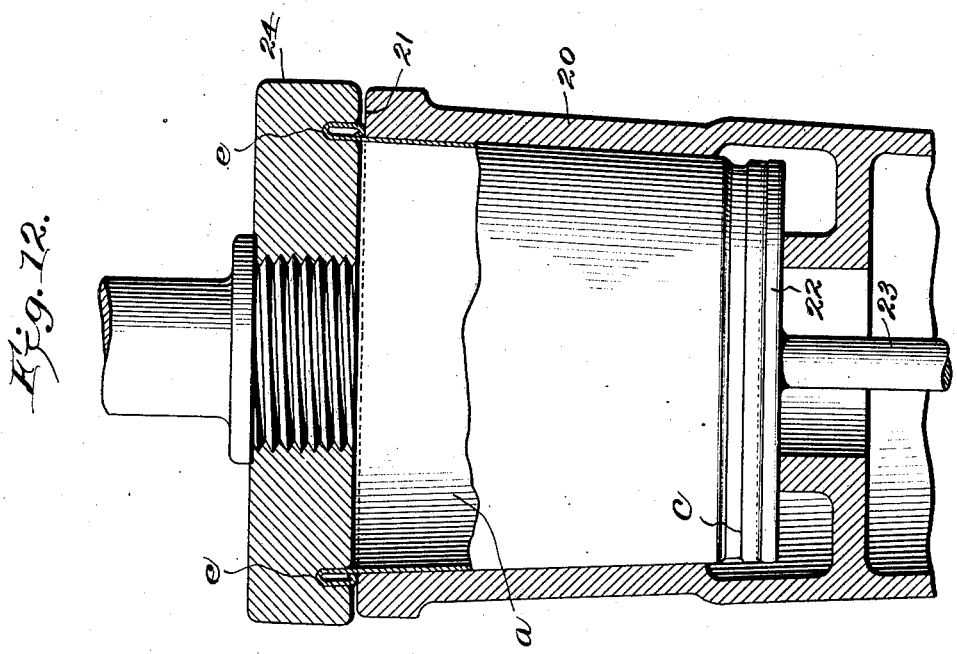
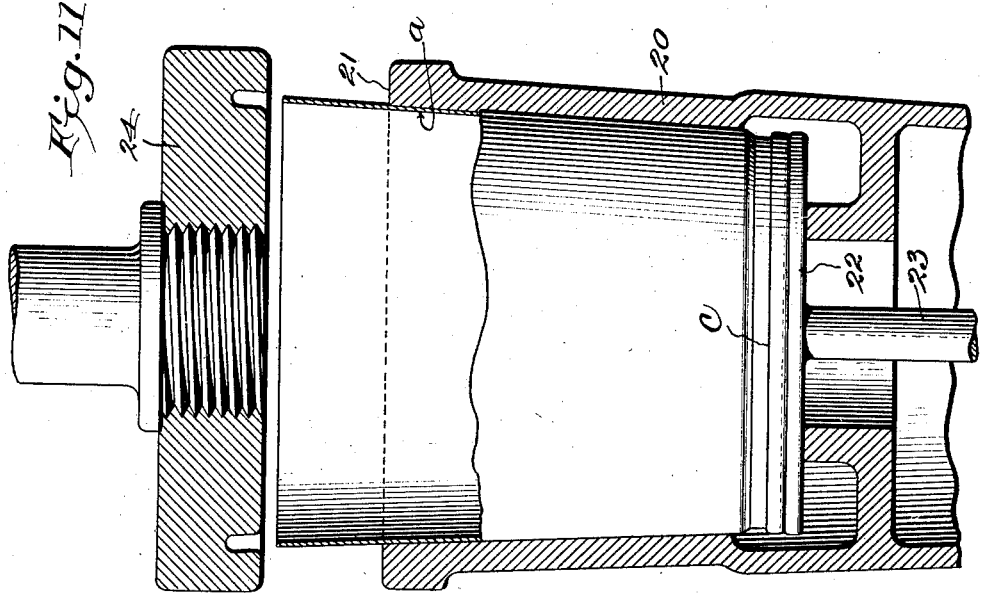

Patented Mar. 26, 1929.

1,706,910

UNITED STATES PATENT OFFICE.

WILBUR L. WRIGHT, OF FULTON, AND JOSEPH T. BOND, OF PHOENIX, NEW YORK, ASSIGNORS TO OSWEGO FALLS CORPORATION, OF FULTON, NEW YORK, A CORPORATION OF NEW YORK.

APPARATUS FOR MAKING PAPER CONTAINERS.

Application filed April 20, 1927. Serial No. 185,295.

This invention relates to apparatus for the manufacture of containers that embody sheet paper or like fibrous material barrels or bodies; and the objects and nature of the invention will be readily understood by those skilled in the art in the light of the following explanations of the accompanying drawings that illustrate what we now believe to be the preferred mechanical expression or embodiment from among other forms, constructions and arrangements within the spirit and scope of the invention.

An object of the invention is to provide comparatively simple and effective apparatus for use in the production of paper or equivalent material containers, particularly improved means for shaping the bodies or barrels of such containers.

With this and other objects in view, the invention consists in certain novel features in structure, formation and/or combination as more fully and particularly set forth and specified hereinafter.

Referring to the accompanying drawings, forming part hereof:—

Fig. 5 is a section on the line 5—5, Fig. 1.

Fig. 6 is a section on the line 6—6, Fig. 1.

Fig. 9 is a sectional elevation showing the container body on the mandrel after being shaped by the apparatus of Fig. 1, showing the bottom disk inserted in the body, preparatory to the crimping or securing operation.

Fig. 10 is a sectional elevation showing a crimping head and the barrel end crimped thereby onto the closure disk.

Figs. 11 and 12 show in sectional elevation apparatus for forming the top rim of the paper container that has been bottomed by the mechanisms of Figs. 1 and 10.

Without wishing to so limit all features of our invention, we show a container body or barrel $a$ that is tapered or of decreasing diameter from one end to the other, and this barrel is formed of a paper sheet or blank folded on a suitable form with its ends overlapping and cemented, or otherwise secured together to provide a longitudinal liquid tight seam throughout the length of the barrel. The barrel blank thus formed is greater in length than the barrel of the completed container, to provide an excess length at the large end of the tapered barrel for the formation of a rim, and at the small end of the tapered barrel for shaping and for the formation of a locking or bottom securing crimp.

Figure 1:
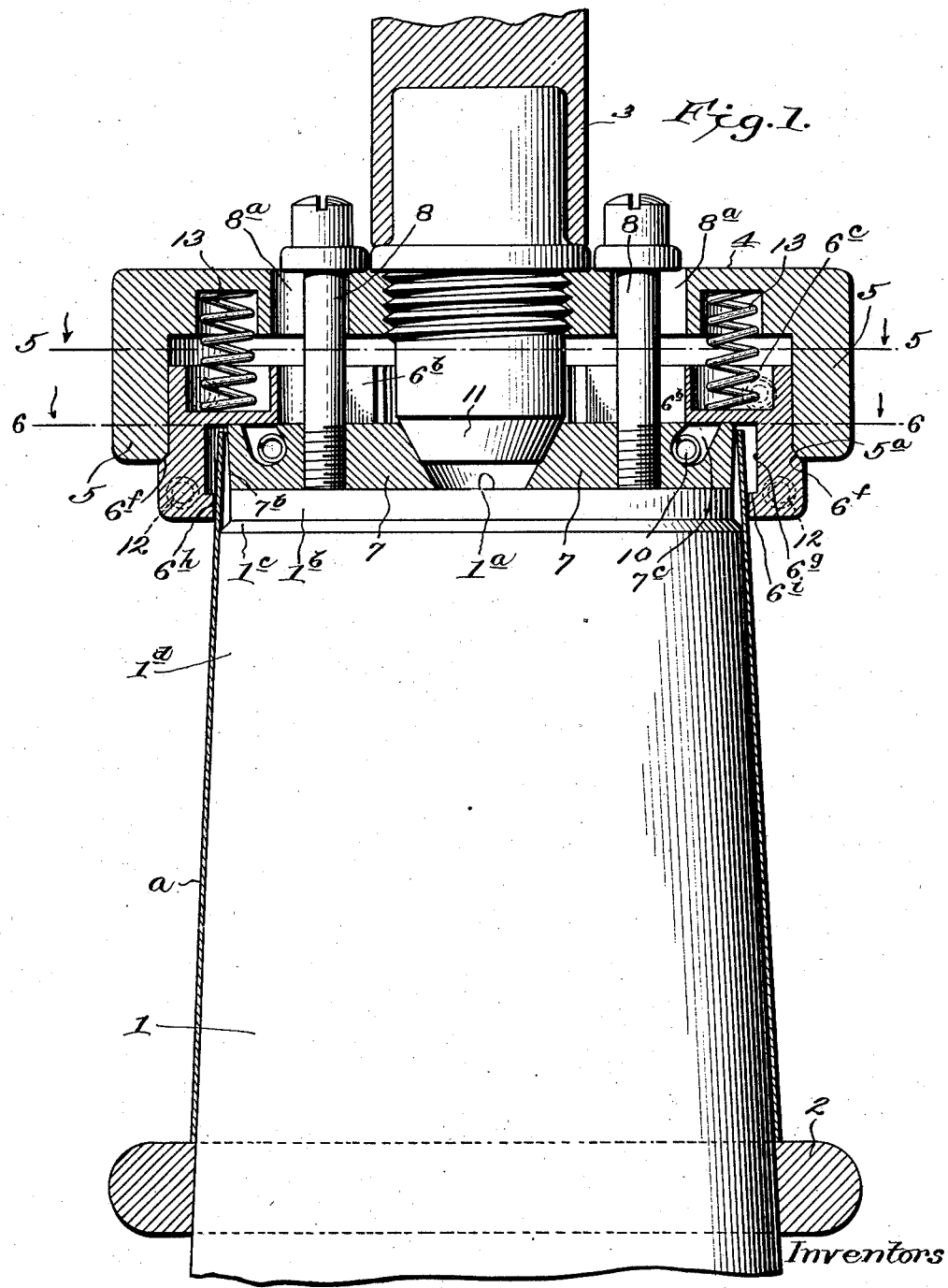
Fig. 1 is a sectional elevation showing in part apparatus for shaping a container barrel, the barrel being shown in longitudinal section on a mandrel shown in elevation, the barrel shaping dies and operating parts being shown in normal or withdrawn positions.

In the apparatus as typified by Fig. 1 of the drawings, this tapered barrel $a$ is placed on a solid tapered mandrel 1 with the lower or large end of the barrel abutting and resting down on a suitable stop or gage ring or sleeve 2. The arrangement is such that the upper or small end of the barrel $a$ projects a distance above the upper end of the mandrel 1. The top end face 1$^a$ of the mandrel is flat and horizontal.

The upper end of the mandrel is annularly rabbeted or reduced in diameter to provide a comparatively short vertical cylindrical wall 1$^b$ of reduced diameter and an outwardly and downwardly flaring annular shoulder 1$^c$ extending from the lower end of vertical cylindrical wall 1$^b$ to the upper end of the tapered wall 1$^d$ of the tapered mandrel.

If so desired, a table having means to advance the same step by step with intervals of rest between each advancing step, can be provided with a series of similar uniformly spaced upstanding mandrels 1, so that each mandrel can be supplied with a tapered paper barrel, as shown in Fig. 1. The machine will be equipped with means to expand and contract the upper end of the paper barrel to form a contracted portion of the barrel with the upper end of the barrel expanded to provide an intervening annular outwardly facing shoulder. The arrangement of the apparatus of the machine can be such that each mandrel carrying a paper barrel will be brought to rest at a point or station where the barrel end will be thus contracted and expanded, and then moved forward to another station where the bottom closure disk $b$ for the container can be dropped into the expanded end of the barrel onto the shoulder and onto the top die face 1ª of the mandrel, and where a suitable tool or implement will thereupon roll or crimp the expanded projecting end of the paper barrel into tight contact with the bottom closure disk $b$ to form the permanent bottom closure of the container.

The machine or apparatus will thus successively present the container barrels at the station where the barrels are shaped and will then successively present the shaped barrel ends at the station where the closure disks $b$ are applied and secured and will then successively present the bottomed containers at a station where they can be removed from the mandrels.

However, we do not wish to limit our invention to such a machine or apparatus wherein a succession of mandrels are moved step by step to these various stations successively, as it is within our invention to provide one or more mandrels wherein the barrel shaping and the bottom disk securing means are movable to and from the mandrel.

In the particular example illustrated for purposes of explanation, we show a container barrel shaping head which in this instance is movable vertically to and from the upper end of the mandrel, being vertically alined therewith.

We do not show the carrying and actuating mechanism for this head although it embodies a suitably actuated and guided vertically reciprocating plunger 3 to the lower end of which is normally fixedly or rigidly secured the main supporting structure of the head, in the form of a horizontal strong disk 4 having a circumferential annular depending flange 5. This disk and its flange thus form a recessed housing providing a central chamber open at the bottom. The flange 5, in this instance, provides a vertical cylindrical inner wall terminating at its lower end with an outwardly and downwardly annular flare or annular cam forming edge 5ª.

This head or housing 4, 5 carries and approximately encloses a contracting annular or ring die, and within said contracting die, an annular or ring expanding die.

Figure 7:
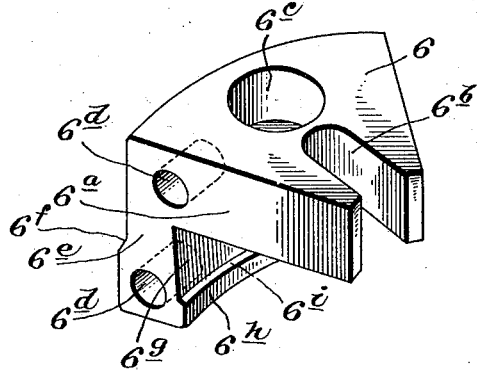
Fig. 7 is a detail perspective of one of the sections of the annular contracting die.

The annular or ring contracting die is made up of an annular series of complementary radially slidable sectors 6, see Fig. 7, having radial edge walls 6ª, flat top and bottom walls, radial vertical guide slots 6ᵇ, top spring seats 6ᶜ, horizontal spring seats or sockets 6ᵈ, and outer depending flanges 6ᵉ having horizontal exterior bevelled or cam shoulders 6ᶠ and interior die faces 6ᵍ and 6ʰ and intervening upwardly facing shoulders 6ⁱ.

Figure 8:
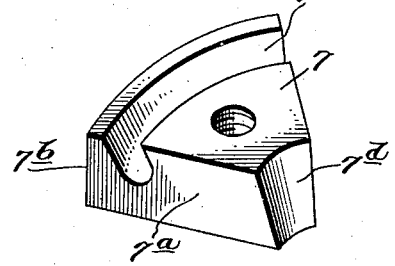
Fig. 8 is a detached detail section of one of the sections of the annular expanding die.
Figure 3:
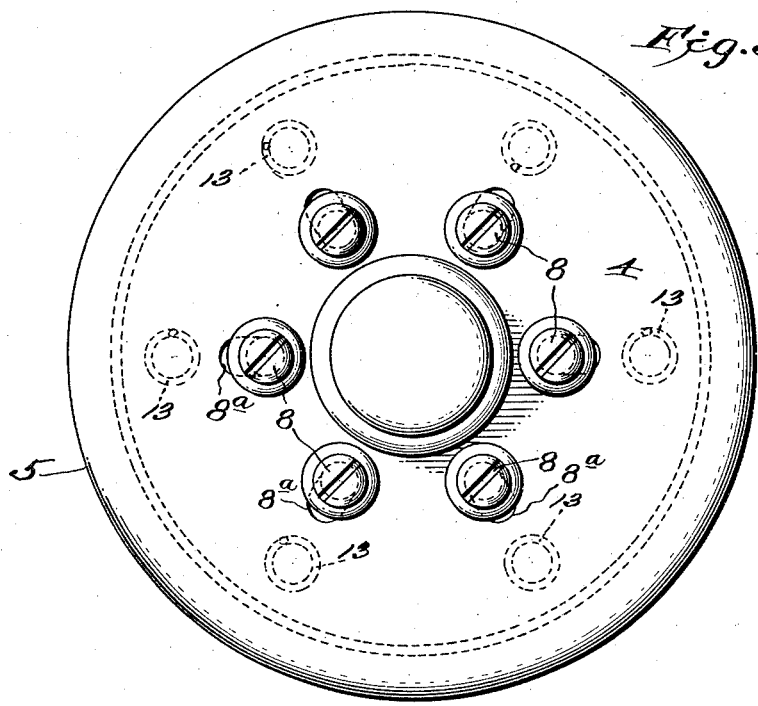
Fig. 3 shows in top plan the head of the apparatus illustrated by Fig. 1.
Figure 4:
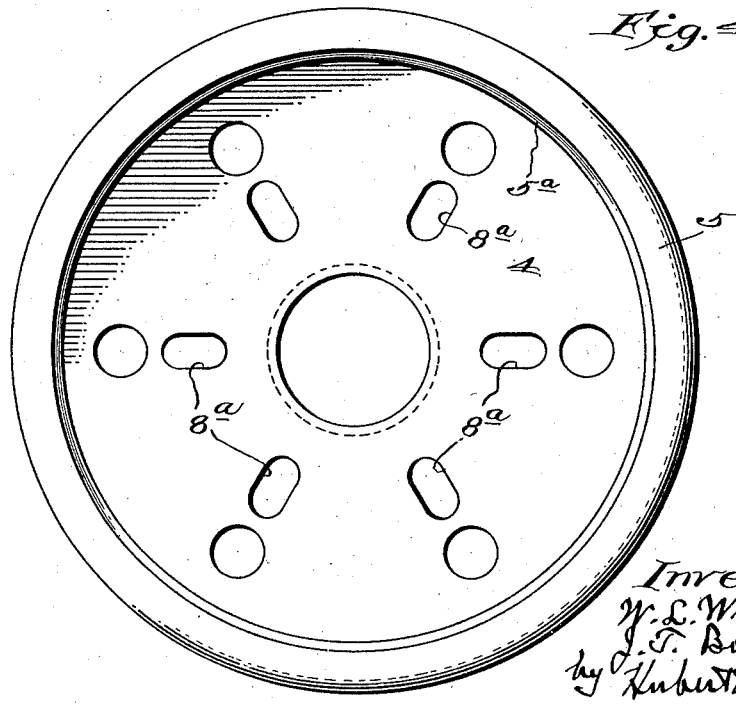
Fig. 4 is a detached bottom elevation of the head that carries the annular dies.

The expanding annular or ring die as made up of an annular series of similar complementary sectors 7, see Fig. 8, each having flat top and bottom surfaces, flat radial vertical side faces 7ª, curved vertical outer surfaces 7ᵇ, top spring retaining groove 7ᶜ and vertically inclined transversely concaved inner end 7ᵈ.

The ring of die blocks or sectors 7 is normally supported by the housing 4 through the medium of upstanding headed studs 8 normally rigid with and rising from the respective die blocks 7 and extending loosely through radial slots 8ª in the disk 4 of the housing, with the heads of the studs overlapping the top face of the disk 4 to uphold the die blocks 7. The vertical slots 8ª are radially elongated to permit radial movements of the die blocks 7 as the expanding ring die formed by said blocks expands and contracts.

Suitable means are provided to expand and contract the ring die composed of blocks or sectors 7. For instance, this ring die can be maintained under constant contracting tendency by spring tension. To this end in the example illustrated, we show the annular arrangement of blocks 7 in a common horizontal plane, with a contracting coiled expansion spring 10 of ring form arranged and confined in the annular groove at the top of the ring die formed by the concentric spring retaining grooves 7ᶜ of the several blocks 7. This spring 10 is expanded in the annular groove in which it is retained, and hence is under constant tension tending to radially slide the blocks 7 inwardly to contract the ring die composed of said blocks.

This ring die composed of blocks 7 is forcibly expanded against the tension of spring 10, to perform the container barrel expanding and shaping function desired, by means of a tapered pin or wedge 11 centrally depending from and normally rigid with the plunger 3 centrally within the housing composed of disk 4 and its flange 5. This wedge or taper 11 is relatively formed with respect to the flaring or upwardly tapered bore or center of the ring die composed of blocks 7 to cooperate therewith by cam action in forcing the die blocks 7 radially outwardly as the wedge 11 descends with respect to the ring die. This tapered bore or center of the ring die is formed by the inclined convexed vertical inner ends 7ᵈ of the blocks 7.

The paper barrel contracting ring die composed of blocks or sectors 6 extends upwardly within and is in part surrounded by the flange 5 of the housing, and rests and is radially slidable on the top wall of the ring die composed of blocks 7, and is in fact upheld by the ring die composed of blocks 7, which, when not resting on the mandrel 1, are upheld by the heads of the studs 8.

The ring die composed of blocks 6, is under constant tendency to expand by radial outward movement of the blocks 6, by reason and under the expanding tendency of coiled expansion springs 12, see dotted lines Figs. 1, 5 and 6 compressed between the respective blocks 6 of the ring die and confined in the spring sockets or seats $6^d$ of the blocks 6.

Vertical expansion coiled springs 13 are seated in the spring sockets $6^e$ of the blocks 6 and compressed between the blocks and the disk 4 of the housing, the under side of said disk 4 being provided with sockets to receive the upper ends of said springs.

These springs 13 are under constant tension to cause vertical separation of the disk 4 and the ring dies.

The two ring dies are fixed against relative vertical movement, and these two dies move as a unit with respect to the carrying head or housing 4, 5, and are normally held by springs 13, at their limit of downward movement with respect to said head (Fig. 1), the heads of studs 8, limiting said downward movement. In this normal relation of the parts, the flange 5, of the head surrounds and limits the expansion of the contracting ring die 6, which is in normal expanded condition with the head 4, 5, in its normal elevated position, the bevel $5^a$, of its flange 5, resting on the cam bevel $6^f$, of the flange of ring die 6; the expanding ring die 7, is in its normal contracted condition with its circumferential vertical annular die face $7^b$, spaced inwardly a distance from the surrounding inner annular die face $6^g$, of the ring die 6, and with the horizontal plane of the flat bottom side face of the ring die 7, arranged slightly above the horizontal plane of the upwardly facing inner annular shoulder $6^h$, of the ring die 6.

The external diameter of the lower end of the ring die 7, when in its normal contracted condition, is approximately the same as the diameter of the mandrel die face $1^a$, and the reduced cylindrical upper end $1^b$, of the mandrel.

The external diameter of the contracted ring die 7, while approximately the same as the external diameter of the upper end of the mandrel, is not too large to freely enter the upwardly extending end of the paper container barrel $a$, projecting above the mandrel, and the normal internal diameter of the ring die 6, at the inner vertical annular die face $6^h$, is sufficiently large to pass down at the exterior of the paper barrel $a$, on the mandrel to a point opposite the mandrel cylindrical wall $1^b$, and just above bevel $1^c$.

With the paper barrel on the mandrel, and with the ring dies positioned with respect to their carrying head or housing, all positioned as in Fig. 1, the head descends toward the mandrel to the position shown by Fig. 1, wherein the ring die 7, rests on the die face $1^a$, of the mandrel and the ring dies are, respectively, within and surrounding the upper end of the container barrel. Thereupon continued downward movement of the head, is relative to the ring dies, and results in simultaneous expansion of ring die 7, and contraction of ring die 6, with the result that the paper barrel is radially crushed, molded and contracted inwardly to conform to the bevel $1^c$, and reduced end $1^b$, of the mandrel, below the level of ring die 7, by the annular die face $6^h$, of ring die 6, at the same time that the upper end of the paper barrel, above the level of the inner annular shoulder $6^i$, of ring die 6, is radially expanded by the vertical outer annular die face $7^b$, of ring die 7, and crushed and molded thereby against the annular inner vertical face $6^g$, of ring die 6, and to conform to the annular upwardly facing inner shoulder $6^i$, of ring die 6.

These operative strokes of the ring dies under continued downward movement of the head, are caused with respect to ring die 6, by the engagement of bevel $5^a$, of the downwardly moving head flange riding down over bevel $6^f$, of ring die 6, and with respect to ring die 7; by the downwardly moving taper or wedge 11, forcibly entering the bore formed by the tapered ends $7^d$, of the blocks or sections of the ring die 7.

Figure 2:
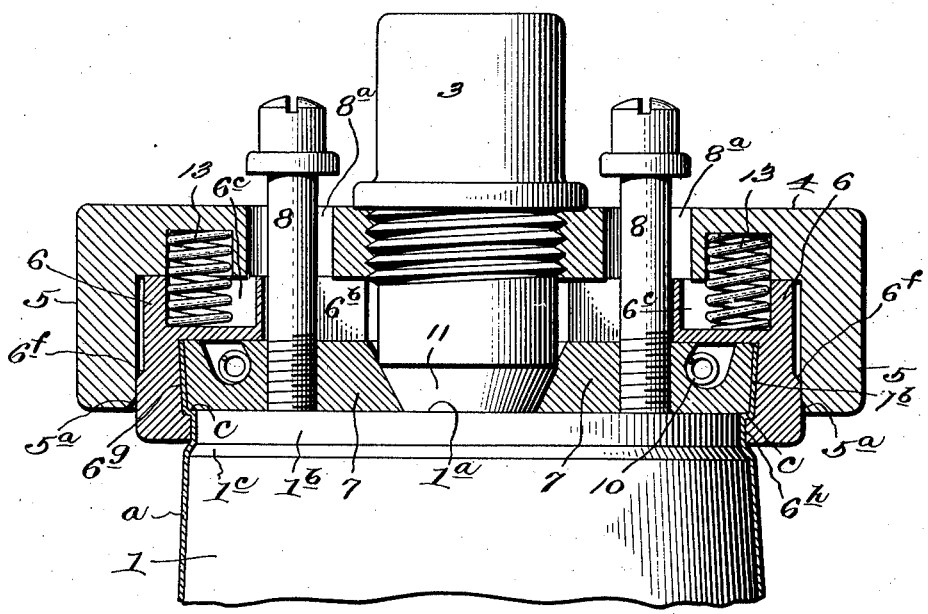
Fig. 2 is a sectional elevation showing the parts illustrated by Fig. 1 in operative contracted container barrel shaping position.

This relative downward movement of the head continues until the taper 11, strikes the mandrel or the disk 4, of the head strikes the ring die 6, and the paper barrel end has been molded to the required form. When the barrel $a$, has been thus formed (see Fig. 2), the head starts on its return (upward) stroke, and during the initial movement of the return stroke, the housing 4, 5, moves up relatively to the ring dies, and as this initial movement takes place, the ring die 7, contracts as the taper 11, ascends, and the ring die 6, expands as the flange 5, moves up to clear the bevel $6^f$, until the top of the housing disk 4, engages the heads of the studs 8, whereupon the assembly of ring dies moves up with the housing clear of the mandrel and shaped upper end of the container barrel $a$.

It will be noted, that the annular reduced upper end $1^b$, $1^c$, of the mandrel forms a shaping die that cooperates with the die face $6^h$, of the ring die 6, in radially contracting an annular portion of the container barrel, and that the inner annular die face or surface $6^g$, of the ring die 6, cooperates with the surface or die face $7^g$, of ring die 7, in shaping the expanded upper end of the container body $a$, and that the mandrel, lower annular corner of ring die 7, and annular shoulder $6^i$, of ring die 6, cooperate in forming the more or less abrupt annular upwardly facing seat or shoulder $c$, within the container body and joining or intervening between the annular contraction and the upper expanded end of the barrel.

When the container barrel shaping head and the mandrel carrying the shaped container barrel have been separated, the container barrel remains on the mandrel with its upper end shaped, approximately as shown by Fig. 9. The container bottom closure disk b, preferably of stiff imperforate sheet paper or pulp board or other paper material, is then inserted in the expanded upper end of the container barrel and forced down therein onto the shoulder c, of the container barrel, and onto and parallel with the mandrel top die face 1ª.

Thereupon, any suitable crimping head, such as 15, Figs. 9 and 10, descends onto the container barrel end, and the closure disk c, and rolls or crimps the expanded upper end of the barrel a, into a tight permanent roll or crimp d, and compresses the disk c against the mandrel die face 1ª, and the container barrel shoulder c, and the roll or crimp against the disk c, thereby permanently locking the disk c, to and in the container barrel to form a liquid tight bottom with the disk in effect compressed between the shoulder c, and the crimp d.

It will be noted that the crimping head has a face 15ª, to compress disk b, against the mandrel die face, and a depending approximately cylindrical inner ironing and pressing surface 15ᵇ, forming a downward continuation of the outer wall of the crimping groove 15ᶜ, to shape and inwardly compress the outer wall of the expanded end of the container barrel against the circumferential edge of the bottom disk b.

When the crimping head and paper container are separated from the positions shown by Fig. 10, the taper container is provided with its permanent bottom closure and can then be removed from the mandrel 1, for formation of a suitable top rim or mouth, if so desired.

For forming the mouth or rim portion of the container barrel, we provide, see Figs. 11 and 12, a hollow tapered mandrel 20, increasing upwardly in diameter to its open upper end which is surrounded by top die face 21. The bottom of this hollow mandrel, can if so desired, be formed by the head 22 of an upwardly movable container ejecting plunger 23.

The bottom tapered paper container, is removed from the mandrel, Fig. 10, and placed in the hollow mandrel 20, Fig. 11, in which it snugly fits, with its bottom resting and seated on head 22, and with the over long flaring large end of its paper barrel projecting upwardly from the mandrel over the top die face 21, of said mandrel.

A suitable crimping or rim forming head 24, thereupon descends on the outwardly flaring projecting upper end of the paper barrel a, of the container and rolls or turns the same outwardly and downwardly against die face 21, and cooperates therewith in forming said barrel end into permanent exterior annular rim e, Fig. 12, usually exteriorly vertically cylindrical, while the annular portion of the inner wall of the container barrel that is surrounded by rim e, remains tapered in upward continuation of the upwardly flaring taper of the barrel.

The completed container, as it appears in Fig. 12, on removal of the crimping head 24, is ready for ejection from the hollow mandrel 20.

The method of making paper containers, and the product, both disclosed hereby, are not claimed herein but are claimed by our pending applications for paper containers filed Feb. 15, 1927, S. No. 168,333 and for paper container bottom closure filed Feb. 15, 1927, S. No. 168,334.

The particular embodiment illustrated is shown for purposes of explanation and disclosure but not in a strictly limiting sense, as it is evident that various modifications, variations, changes, omissions and/or additions might be resorted to without departing from the spirit and scope of our invention as defined by the following claims.

What we claim is:—

1. In apparatus for the production of paper containers and parts thereof, a mandrel to receive a paper container barrel, in combination with cooperating inner and outer expanding and contracting ring dies, and operating means therefor.

2. In apparatus for shaping a paper barrel for the reception and securing of an end closure disk, a mandrel to exteriorly receive the barrel, said mandrel having a reduced upper end, means to radially compress and contract the barrel against said reduced end, and means to radially expand the barrel above said reduced end of the mandrel for the formation of an annular internal shoulder within the barrel with the barrel end beyond the shoulder expanded for the reception of an end closure disk to be seated on the shoulder.

3. In apparatus for use in shaping paper barrels for the reception of an end closure disk, a tapered mandrel having a reduced end providing an annular shoulder and an approximately cylindrical end portion, means to compress and contract a tapered paper barrel on said mandrel to and against said cylindrical portion, and die means to expand the upper end of the paper barrel above said cylindrical portion for the formation of an intermediate annular outwardly facing shoulder within the barrel.

4. Means for shaping the end portion of a paper container barrel, comprising die faces having relative radial movement to radially contract an end portion of the paper barrel, and cooperating die means to radially expand the end portion of the paper barrel, for the formation of an intervening annular outwardly facing shoulder within the barrel between the contracted and expanded portions thereof.

5. A mandrel having an end die face and a contracted end portion extending to said die face, said mandrel formed to exteriorly receive a paper container barrel with its end projecting beyond the mandrel and surrounding said reduced end thereof, in combination with a ring die formed to contract an intermediate annular portion of the barrel and compress the same against said reduced portion of the mandrel, and a cooperating ring die formed to expand the projecting end of the paper barrel, said ring dies cooperating to form an intermediate annular shoulder in the barrel between the contracted and expanded portions of the barrel.

6. A mandrel formed to longitudinally and exteriorly receive a paper container barrel with its end portion projecting beyond the mandrel, in combination with a ring die formed to radially contract an intermediate portion of the barrel, and a cooperating ring die formed to radially expand the projecting portion of the barrel, said two ring dies formed to cooperate in pressing the expanded portion of the barrel to expanded form and in forming the barrel with an internal annular shoulder, and operating means for simultaneously actuating the two ring dies in their barrel shaping operation.

7. Means for shaping a paper container barrel to form an end thereof with an internal annular outwardly facing shoulder and the barrel end beyond the shoulder shaped to expanded form, comprising a pair of cooperating expanding and contracting ring dies arranged one within the other, and operating means for said dies.

8. A paper container barrel receiving mandrel having its end portion shaped to form a die face, in combination with a head carrying a ring die to extend down on a paper barrel on the mandrel and formed to press the paper barrel to said shaped portion of the mandrel, and another ring die arranged to extend down within the barrel on the mandrel and to expand the end portion of the barrel within the first mentioned ring die, and operating means for said ring dies.

9. A mandrel formed to exteriorly and longitudinally receive a paper container barrel, in combination with a head carrying a normally contracted expansible ring die to enter the end of the paper barrel on the mandrel and radially expand said paper barrel end, and another ring die carried by said head and formed to extend down at the exterior of the paper barrel on the mandrel and to cooperate with the first mentioned ring die in the formation of an annular internal shoulder within the paper barrel and in expanding the outer end of the paper barrel, means being provided for simultaneously operating the two ring dies.

10. A mandrel to exteriorly and longitudinally receive a paper container body, in combination with a head, and inner and outer concentric ring dies carried by said head as a unit, said ring dies being relatively radially expansible and contractible, said head, and ring dies as a unit, being relatively movable longitudinally, and cam means operative by the relative movement of the head, and dies as a unit, for controlling the expansion and contraction of the dies.

11. In mechanism for shaping the end portions of paper container barrels for the formation therein of internal annular outwardly facing shoulders to receive inset closure disks, a head having an annular flange with a bevelled cam portion, said head provided with a central taper or wedge, in combination with inner and outer concentrically arranged ring dies carried by the head, relative longitudinal movement being provided for between the ring dies as a unit, and the head, the outer ring die being under constant spring tension tending to expand the same, the inner ring die being under constant spring tension tending to contract the same, said outer ring die formed to be contracted by said bevelled cam portion, and said inner ring die formed to be expanded by said taper or wedge.

12. In mechanism for shaping a paper container barrel for the reception of an end closure, a head carrying and relatively longitudinally movable with respect to a pair of inner and outer concentric ring dies, each embodying an annular series of radially slidable die blocks, and means controlling the radial movements of the die blocks for the expansion and contraction of the ring dies.

13. A mandrel for the longitudinal and exterior reception of a paper container barrel with one end projecting beyond the mandrel end, said end of the mandrel having an end die face, in combination with a head having an inner expansible ring die formed to enter the projecting end of the barrel and fit the end die face of the mandrel, and an outer contractile ring die formed to extend down at the exterior of the barrel and provide an outwardly facing annular shoulder to cooperate with the inner ring die in forming the barrel end with an internal annular outwardly facing shoulder to receive an end closure disk for bottoming the container barrel.

14. In combination, a mandrel to hold a paper container barrel; an expansible ring die for expanding the end of the barrel held by the mandrel; a contractile ring die for cooperating with the expanding die to shape the barrel with an expanded end and an intermediate internal annular seat for receiving an end closure inserted through the expanded barrel end; and operating means for said dies.

Signed at Fulton, county of Oswego, State of New York, this 19th day of April, 1927.

WILBUR L. WRIGHT.
JOSEPH T. BOND.